(12) United States Patent
Cortenraad et al.

(10) Patent No.: US 7,562,985 B2
(45) Date of Patent: Jul. 21, 2009

(54) MIRROR ASSEMBLY WITH INTEGRATED DISPLAY DEVICE

(75) Inventors: Hubertus M. R. Cortenraad, Eindhoven (NL); Anthonie H. Bergman, Eindhoven (NL); Jan B. A. M. Horsten, Eindhoven (NL); Marc J. R. Op De Beeck, Dessel (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 492 days.

(21) Appl. No.: 10/555,835

(22) PCT Filed: Apr. 28, 2004

(86) PCT No.: PCT/IB2004/001461

§ 371 (c)(1),
(2), (4) Date: Nov. 7, 2005

(87) PCT Pub. No.: WO2004/100534

PCT Pub. Date: Nov. 18, 2004

(65) Prior Publication Data

US 2008/0106705 A1    May 8, 2008

(30) Foreign Application Priority Data

May 9, 2003   (GB)   .................... 0310654.9

(51) Int. Cl.
*G03B 21/28*   (2006.01)
(52) U.S. Cl. .............................. 353/28; 353/97; 353/98; 359/630; 345/7

(58) Field of Classification Search ............... 353/7–10, 353/28, 29, 37, 98, 99, 20, 97; 348/752–757, 348/762; 349/9, 15, 16, 57, 62; 359/630; 345/7, 8, 9

See application file for complete search history.

(56) References Cited

U.S. PATENT DOCUMENTS 2,899,860 A   8/1959   Scott et al.
(Continued)

FOREIGN PATENT DOCUMENTS

JP   J10073785   3/1998
(Continued)

*Primary Examiner*—William C Dowling

(57) ABSTRACT

A mirror assembly (18) for displaying an image (15) in conjunction with the reflection (14') of a viewer comprises a mirror (2), which is equipped with a reflective polariser (13), arranged to reflect light (3) incident on its viewing side and transmit light (4) incident on its non-viewing side, where the reflected light (3) and transmitted light (4) may be of different polarization. The image (15) is displayed by a device (5) located on the non-viewing side and focused by a focusing element, e.g. one or more lenses (12, 12a), onto an image plane. The image plane may be located between the mirror (2) and viewer (14), so that a perceived image (15') appears to stand out from the mirror (2). Alternatively, the image plane may be located so that the perceived image (15') forms a background in which the viewer's reflection (14') is immersed. The mirror assembly (1) may further comprise one or more detectors (19) for obtaining a silhouette (21) of the viewer (14). The silhouette (21) can be subtracted from an image (15) to produce a modified image (24) for display by device (5), thereby avoiding competition between the perceived image (15') and viewer reflection (14).

24 Claims, 6 Drawing Sheets

U.S. PATENT DOCUMENTS

| | | | |
|---|---|---|---|
| 4,434,467 A * | 2/1984 | Scott .......................... 700/90 |
| 5,257,130 A | 10/1993 | Monroe |
| 5,782,547 A * | 7/1998 | Machtig et al. ............... 353/28 |
| 5,808,589 A | 9/1998 | Fergason |
| 5,838,498 A | 11/1998 | Hildebrand et al. |
| 5,944,403 A * | 8/1999 | Krause ......................... 353/74 |
| 6,042,235 A * | 3/2000 | Machtig et al. ............... 353/28 |
| 6,195,104 B1 | 2/2001 | Lyons |
| 6,257,727 B1 * | 7/2001 | Melville ....................... 353/28 |
| 6,262,841 B1 * | 7/2001 | Dike .......................... 359/483 |
| 6,497,484 B1 | 12/2002 | Hoerner et al. |
| 6,935,747 B2 * | 8/2005 | Westort et al. ................ 353/28 |
| 6,984,039 B2 * | 1/2006 | Agostinelli .................. 353/28 |
| 2002/0196333 A1 | 12/2002 | Gorischek |
| 2003/0035086 A1 * | 2/2003 | Robinson et al. ............. 353/10 |
| 2003/0043345 A1 * | 3/2003 | Westort et al. ................ 353/20 |
| 2008/0013050 A1 * | 1/2008 | Boute et al. ................... 353/10 |

FOREIGN PATENT DOCUMENTS

| | | |
|---|---|---|
| WO | WO199603670 | 2/1996 |
| WO | WO2002061492 | 8/2002 |
| WO | WO2003079318 | 9/2003 |
| WO | WO2003079324 | 9/2003 |

* cited by examiner

MIRROR ASSEMBLY WITH INTEGRATED DISPLAY DEVICE

The invention relates to a mirror assembly with an integrated display device and is particularly suitable for applications in which an image is to be emphasised over the user's reflection and applications in which an image is displayed in a form that complements to the user's reflection.

A vanity console comprising a mirror and a built-in display device is described in US 2002/0196333 A1. The display device is installed behind the mirror and connected to a camera, projector, video or Digital Versatile Disc (DVD) player. When activated, the display device outputs light that is transmitted through the mirror, so that the user can view their reflection and images from the display device simultaneously. In one suggested application a user may, by means of this device, preview their appearance when wearing make-up, without needing to physically apply the cosmetics.

In a co-pending application, WO 2003/79324A, a mirror assembly is disclosed which comprises a surface that reflects light with a first polarisation and transmits light with a second polarisation. A built-in liquid crystal display (LCD) device emits light with the second polarisation, so images may be displayed to a user through said mirror. The images are displayed alongside the user's reflection, so that a user may view news, weather reports, television or other information, such as instructions to be followed, while performing activities such as shaving, cleaning teeth, bathing, styling hair or applying makeup.

A user of either of these prior art arrangements would see the images as displayed, so that the images appear to be located in the plane of the display device and in front of the user's reflection. These arrangements cannot, therefore, be used effectively in applications that require images to be located in another plane. For example, the prior art arrangements described above cannot be used to produce an image that provides an "immersive" environment by displaying an alternative background to the user's reflection, as the user will always perceive his reflection as being located behind the image.

Instead, in a conventional method for projecting a user's image onto an alternative background, the user's image is recorded in front of a plain background, such as a blue screen. An image processing routine is then used to combine the user's image with a background image. However, this method requires recordal and display of the user's image, which may lead to loss of image quality. In addition, when displayed, the combined image produced by this method is limited to a single two-dimensional plane.

It is an object of the present invention to provide a mirror assembly arrangement that overcomes one or more of the problems described above.

According to a first aspect of the invention, a mirror assembly comprises an element with a viewing and a non-viewing side, configured to reflect light incident on the viewing side and to pass light incident on the non-viewing side to the viewing side, and a display device on the non-viewing side of the element, the assembly being configured so that an image output by the display device is focussed onto an image plane that does not coincide with the location of the display device.

A focussing element, such as a lens or a parabolic mirror, may be located on the non-viewing side of the element and arranged to focus the image output by the display device onto said image plane. The inclusion of a focussing element between the display device and element allows the image projected by the display device to be focussed so that the user perceives the image to be located at a desired image plane, other than that of the display device. An image can be displayed alongside a user's reflection in a less restrictive manner, in order to enhance the combination of reflection and image. For example, the image plane may be selected so that a user can view the displayed image and their reflection without refocussing, or so that the image is emphasised or provides an alternative background to the user's reflection.

Where the focussing element comprises a lens, a second lens may be provided in order to reduce the dimensions of the mirror assembly. Alternatively, a lens may be provided in an optical system with a variable focal length, such as those based on electro-wetting lenses, so that the location of the image plane can be adjusted.

Preferably, the element reflects light with a first kind of polarisation and transmits light of a second polarisation. Furthermore, the display device may emit or reflect light of the second kind of polarisation. In these scenarios, the first and second polarisations may be linear and perpendicular to one another or circular or elliptical polarisations with opposite senses or "handedness". The element may be a cholesteric mirror, in particular where the first and second polarisations are circular or elliptical polarisations.

The display device may be a liquid crystal display device that emits light of a particular polarisation.

The mirror assembly may further comprise audio output means in order to present sounds associated with the displayed image, for example, in order to provide an enhanced "immersive environment" for the user's reflection.

The mirror assembly may also comprise monitoring means, for example a camera, for imaging or determining the position of a user and processing means for using such information to modify the image to be displayed accordingly. A movement detector may also be provided for this purpose.

According to a second aspect of the invention, a mirror assembly comprises a reflective element arranged to reflect light incident on a viewing side and to transmit light incident on a non-viewing side, a display device and a focussing element, wherein the display device and focussing element are disposed on the non-viewing side of the reflective element and the focussing element is arranged to focus an image output by the display device onto an image plane that does not coincide with the location of the display device.

According to a third aspect of the invention, a method of displaying an image in a mirror assembly comprising a reflective surface, comprising the steps of capturing an image of a subject located at a viewing side of the reflective surface, superimposing a silhouette corresponding to the subject image with a second image to form a display image and displaying said display image on a display device located at a non-viewing side of the reflective surface.

This method modifies an image to be output by a display device in a mirror assembly so that an area in the image that, when viewed by a user, will coincide with their reflection is removed. This ensures that the user's reflection is not obscured by the displayed image, even if there is a significant difference between their respective brightness levels.

The step of capturing a subject image may comprise recording images on more than one camera and/or detecting movement of the subject. Such images and data, or similar, may be used to provide information on the position of the subject, so that the display image may be corrected in accordance with the position of the subject. For example, corrections may be made to correct distortions in the image as seen by a viewer at a position that is not on an optical axis of the mirror assembly.

The display image may be focussed onto an image plane that does not coincide with the display device, for example, a plane located between the reflective surface and subject. The method may further comprise selecting an image plane by adjusting a variable focal length lens system.

The image is preferably displayed by emitting or reflecting light substantially of a predetermined polarisation. Audio signals associated with the image may also be output.

According to a fourth aspect of the invention, a mirror assembly comprises a reflective element arranged to reflect light incident at a viewing side and to transmit light incident on a non-viewing side, a display device located at a non-viewing side of the reflective element and means for capturing an image of a subject and transmitting said subject image to a processor, wherein the processor is configured to superimpose a silhouette corresponding to the subject image with a second image to form a display image and to display said display image on the display device.

Embodiments of the invention will now be described with reference to the accompanying drawings, in which.

Figure 1:
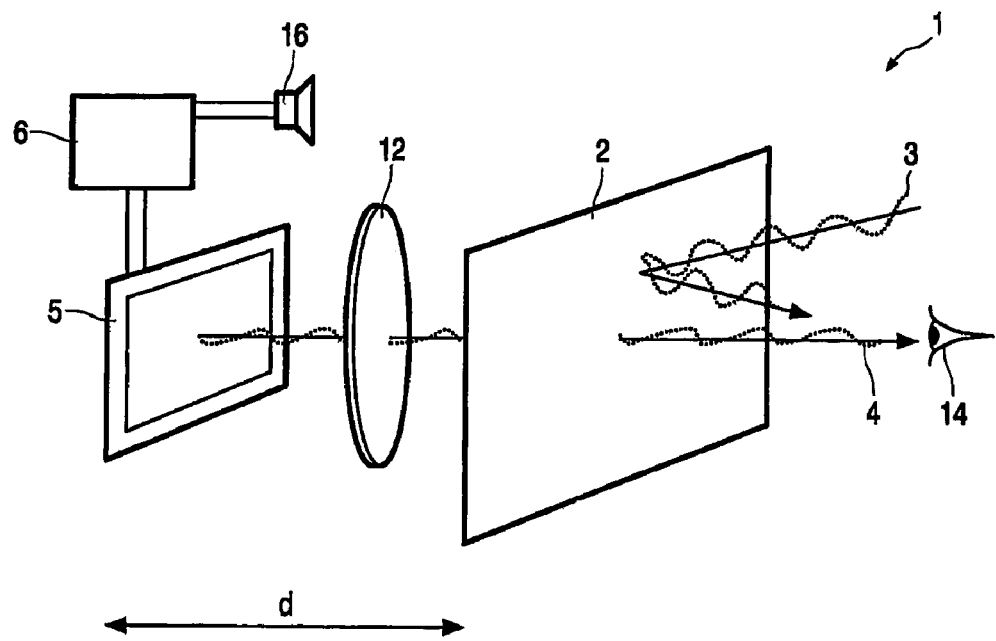
FIG. 1 is an exploded view of a mirror assembly according to a first embodiment of the invention.

Referring to FIG. 1, a mirror assembly 1 according to a first embodiment of the invention comprises a glass plate 2 with a reflective surface and equipped with a reflective polariser, arranged to reflect light of a first polarisation 3 incident at a viewing side and to transmit light of a second polarisation 4 incident at a non-viewing side. In this example, the first and second polarisations are linear and mutually orthogonal.

Figure 2:
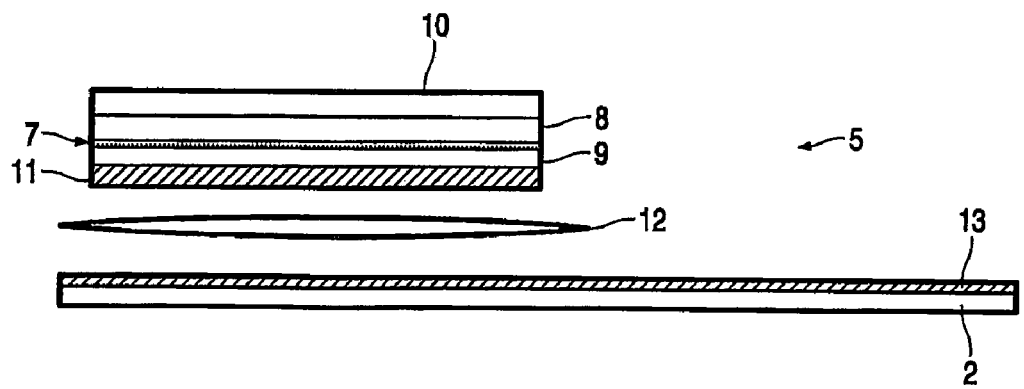
FIG. 2 is a plan view of part of the mirror assembly of FIG. 1.

A display device, such as an LCD 5, is mounted behind the glass plate 2, that is to say, on a non-viewing side of the reflective surface and connected to an image source 6, such as a computer, a DVD or video player. As shown in FIG. 2, the LCD 5 comprises a liquid crystal 7 disposed between two substrates 8, 9, of suitable material such as glass or plastic, a backlight 10 and a first polariser 11. The light 4 produced by the LCD 5 is substantially of the second polarisation. The light is then refracted by a positive lens 12, such as a Fresnel lens, and passes through the reflective polariser 13 mounted on the glass plate 2 before being transmitted through the reflective surface.

Figure 3:
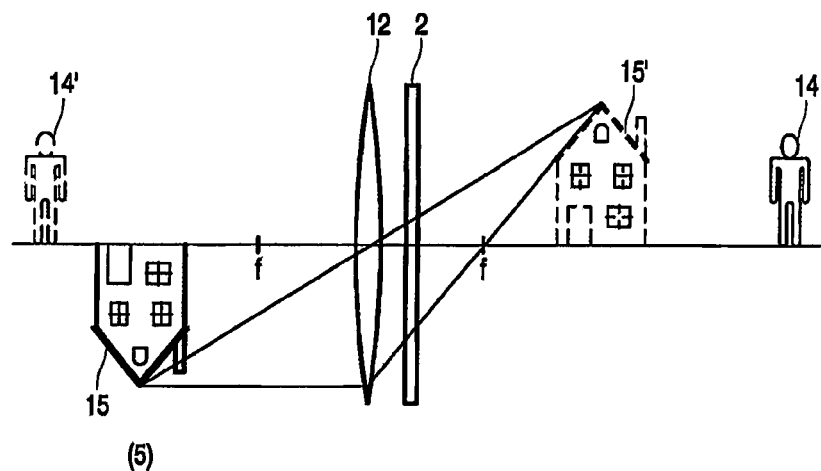
FIG. 3 shows the optical geometry of the mirror assembly of FIG. 1 when arranged to produce an image that is perceived as being located in front of the mirror.

With reference to FIG. 3, the distance between the LCD 5 and the lens 12 exceeds the focal length f of the lens 12. A user 14 viewing the mirror assembly 1 would see his or her own reflection 14'. Due to the presence of the lens 12, the user 14 does not see an actual image 15 displayed on the LCD 5, instead seeing a real image 15' of the LCD 5 located in the focal plane of the lens 12, which is in front of the plate 2. The user 14 perceives the real image 15' as being located in front of their own reflection 14' and standing out from the mirror assembly 1, so that the real image 15' is emphasised.

The mirror assembly 1 also includes an audio device 16, such as a loudspeaker, for outputting audio signals associated with the image 15. For example, if the image 15 is from a video or DVD recording, an associated soundtrack can be played to the viewer.

In this particular embodiment, the first polariser 11 and the reflective polariser 13 are linear polarisers which transmit horizontally polarised light. However, if a linear polarisation selective mirror is used in place of the glass plate 2, the reflective polariser 13 can be omitted altogether.

The polarisation orientation of the LCD 5 and reflective polariser 13 are preferably aligned in order to minimise light loss. However, in the embodiment of FIGS. 1 and 2, the glass plate 2 is mounted so that it can be rotated relative to the LCD 5 about an axis that is substantially perpendicular with respect to the reflective surface. This allows the user 14 to vary the transmission factor for the light output by the LCD 5, as this will depend on the alignment between the polarisation axis of the reflective polariser 13 and the polarisation direction of the light 4. In this particular example, the first polariser 11 and the reflective polariser 13 are arranged to transmit horizontally polarised light 4 output by the display device 5. The brightness of the image from the LCD 5 can be adjusted by the user 14 rotating the glass plate 2, thereby rotating the polarisation axis of the reflective polariser 13 relative to that of the first polariser 11. In this manner, the image can be dimmed or obscured completely.

Figure 4:
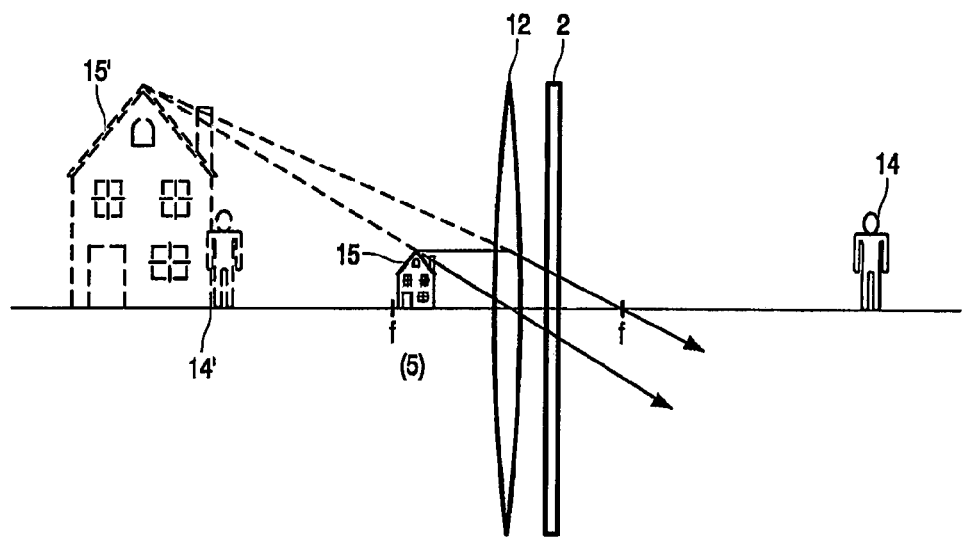
FIG. 4 shows the optical geometry of a mirror assembly according to a second embodiment of the invention.

A second embodiment of the invention will be described with reference to FIG. 4, in which a mirror assembly has a similar configuration to that shown in FIG. 1, but is distinguished by the LCD 5 and the lens 12 being separated by a distance that is less than the focal length f. As before, the user 14 viewing the mirror assembly would see his or her own reflection 14'. However, in this case, the user 14 sees a virtual image 15' of the image 15, which appears to be located in an image plane that is further from the user 14 than the LCD 5.

This arrangement can be used to produce virtual images 15' located in the same plane as the user's reflection 14', where the image 15' is to be superimposed on the user's image, for example for simulating the user's appearance with a different hair style or make up, or to allow the user to view an image 15' and their reflection 14' without having to refocus. Alternatively, this arrangement can be used to produce a virtual image 15' that would be perceived as being behind the user's reflection 14', so that the reflection 14' is "immersed" in a background. For example, FIG. 4 depicts an example in which a virtual image of a house 15' is displayed to form a background to the user's reflection 14'.

In this embodiment, where the image 15 provides an alternative background for the user's reflection 14', such as an image of a beach or jungle, associated audio signals can be played to the viewer through the loudspeaker 16.

Figure 5:
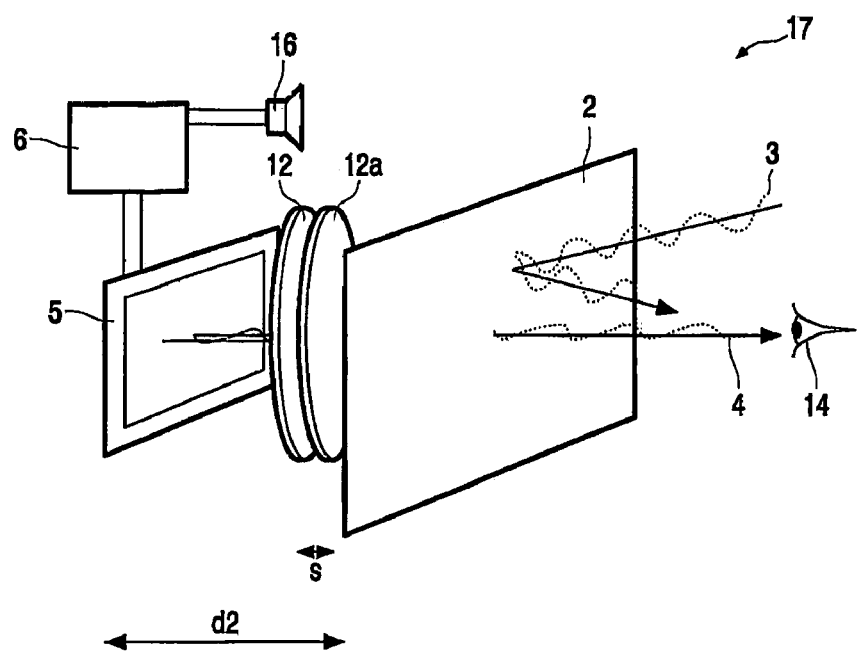
FIG. 5 is an exploded view of a mirror assembly according to a third embodiment of the invention.

However, a potential disadvantage arising from the inclusion of a lens 12, as shown in FIG. 1, is the depth d of the mirror assembly 1, which is greater than the depth of prior mirror assemblies. FIG. 5 depicts a mirror assembly 17 according to a third embodiment of the invention, in which this increase in depth d is mitigated using a second lens 12a. The separation s between the two lenses 12, 12a is less than either of their respective focal lengths. In the case where the lenses 12, 12a are identical, the effective focal length of the lens combination is half the focal length of the individual lenses 12, 12a, allowing the LCD device 5, lens 12 and glass plate 2 to be placed in closer proximity to each other when compared with the first embodiment. The use of a second lens 12a therefore permits a reduction in the depth d2 of the mirror assembly 17 when compared with the depth d of the mirror assembly 1 shown in FIG. 1.

In the above embodiments, the image 15 is simply displayed over, or alongside, the reflection 14' of the user. However, in certain circumstances, for example where the room lighting is low, this may lead to the image 15 and reflection 14' competing, so that the reflection 14' cannot be clearly seen by the user 14 over the image 15. It is possible to configure the processor 6 to control the lighting in an area in which the mirror assembly is installed, so that the reflection is sufficiently bright to overcome this. Alternatively, this effect can be prevented by omitting a part of the image 15 that, when displayed, coincides with the user's reflection 14', as will now be described.

Figure 6:
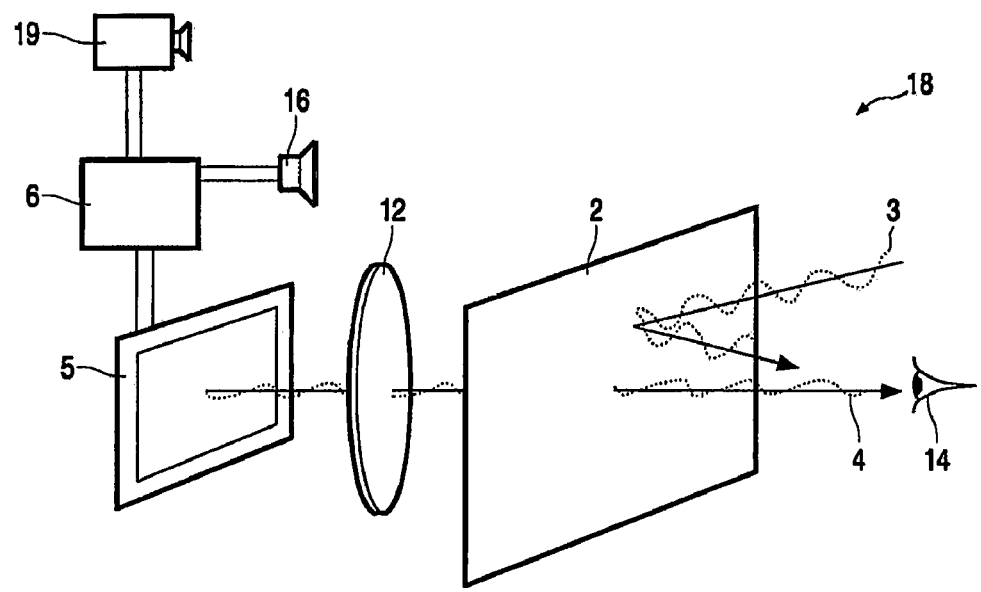
FIG. 6 is an exploded view of a mirror assembly according to a fourth embodiment of the invention.

FIG. 6 depicts a fourth embodiment of the invention, in which a mirror assembly 18 further comprises monitoring means in the form of a camera 19. The camera 19 is positioned so that its field of view covers the area reflected by the reflective surface of the glass plate 2, referred to hereafter as the mirror field, for example by placing the camera 19 close to, or behind, the glass plate 2.

Figure 7A:
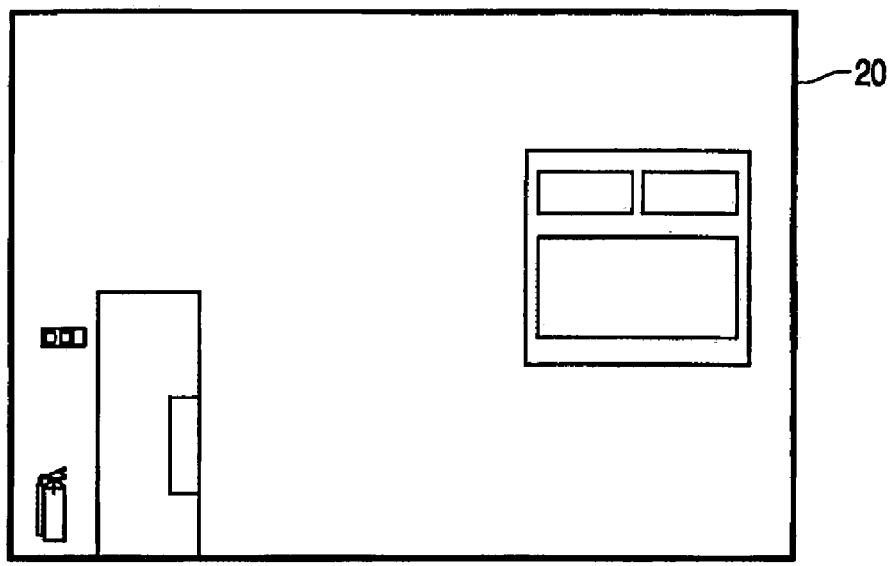
FIGS. 7a to 7d depicts a procedure in which an image of a user is used to modify the image displayed by the mirror assembly of FIG. 6.
Figure 7B:
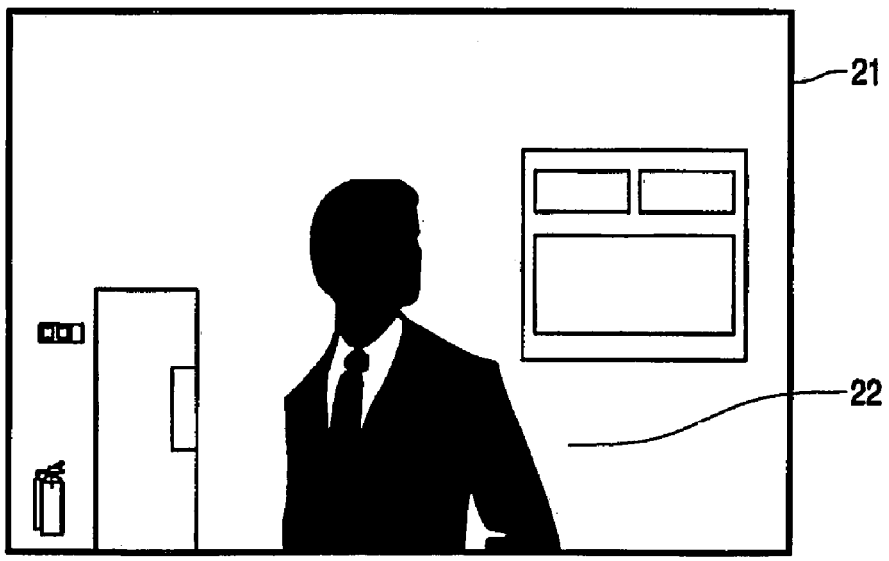
Figure 7C:
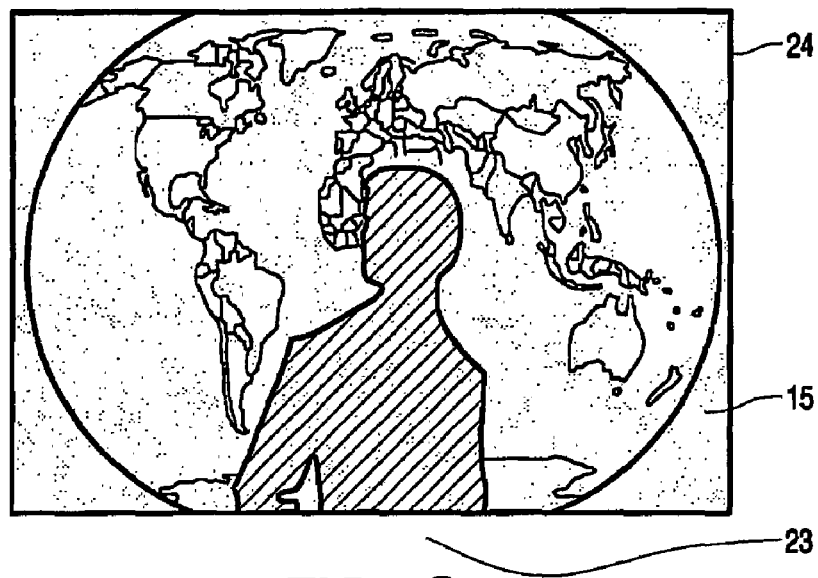

Referring to FIGS. 7a-7d and 8, the camera 19 records an initial image 20 that covers the mirror field (step s8.1), as shown in FIG. 7a. After a predetermined time period t1 (step s8.2), the camera 19 records a current image 21 of the mirror field (step s8.3) and compares it with the initial image 20 using background subtraction (step s8.4). If there are no differences between these images 20, 21 (step s8.5), that is to say, if there have been no changes in the area reflected by the mirror assembly 18, the processor 6 repeats the steps of waiting for a time period t1, recording a current image and comparing it with the initial image 20 (steps s8.2-s8.4). If the processor 6 determines that the second image 21 differs from the initial image 20, for example if the current image 21 includes an image 22 of a user 14 who has entered the mirror field as shown in FIG. 7b, the processor determines the portion of the image 15' that would coincide with the reflection 14' of the user 14. This portion may be defined by presuming that any differences found in the background subtraction procedure form part of the user image 22. A silhouette 23 of the user reflection 14' is defined, in terms of a corresponding portion in the image 15 that is to be displayed by the LCD 5 (step s8.6). A modified display image 24 is then defined, as depicted in FIG. 7c. The modified display image 24 consists of the original image 15 with the silhouette 23 superimposed (step s8.7). In other words, the data corresponding to the original image 15 is removed in the area coinciding with the silhouette 23, as indicated by the shaded portion in FIG. 7c (step s8.7).

Figure 7D:
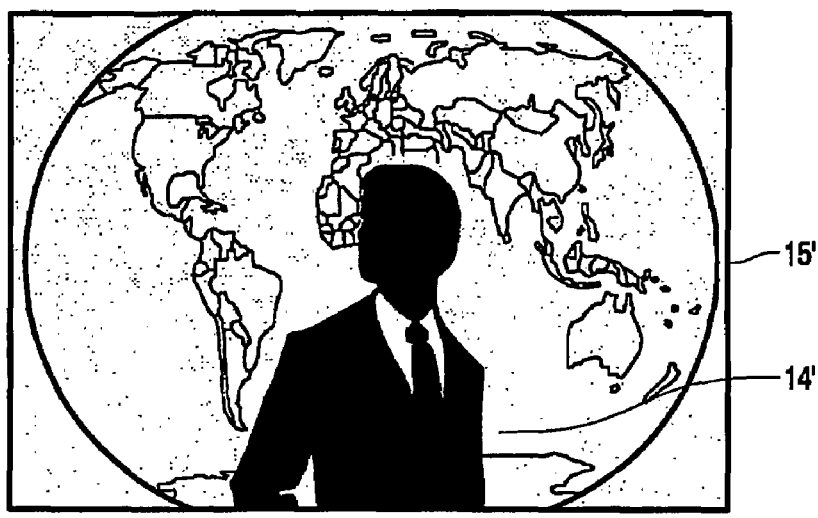
Figure 8:
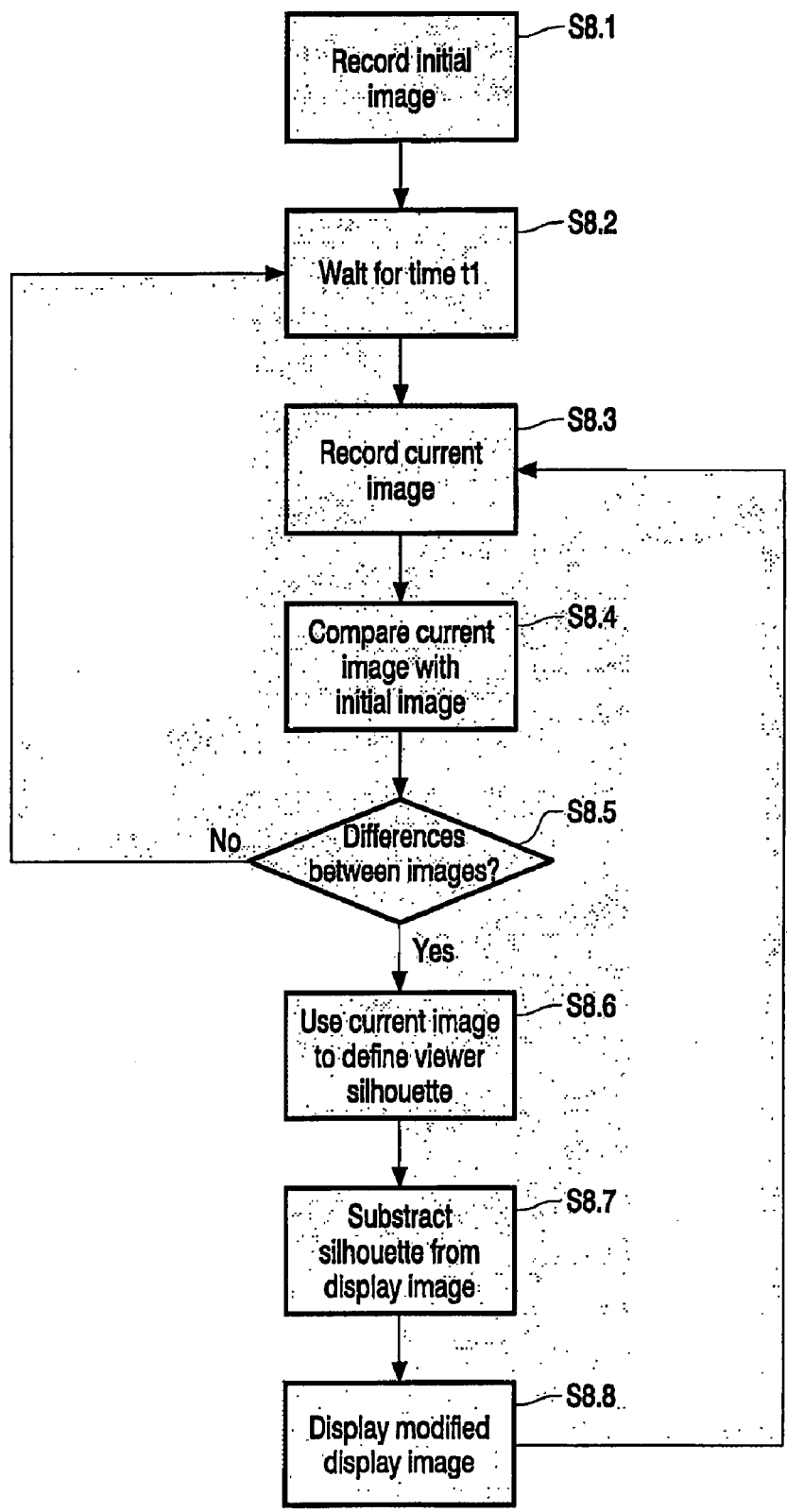
FIG. 8 is a flowchart of the procedure shown in FIG. 7.

The modified display image 24 is then output by the LCD 5 (step s8.8). The user 14 can then view their reflection 14' superimposed with part of the original image 15, as shown in FIG. 7d.

The time period t1 is selected according to the application for which the mirror assembly 18 is being used. In many cases, a time period t1 will be chosen that permits real-time generation of the modified display image 24. Alternative methods for determining the silhouette 23 may be employed as well as, or instead of, the background subtraction procedure described above. For example, the mirror assembly may include a movement detector, where the processor 6 is configured to presume that any moving objects form part of the user image 21. Infra-red detection and lighting can also be used to obtain a user image 21 without disturbing the user 14 with increased lighting in the visible waveband. Pattern recognition, for recognising the human body, or skin tone recognition can also be used to enhance the various methods described above.

In a modification of the mirror assembly 18, the exact position of the user 14 to be determined using a second camera and/or ultra-sound location methods. This information can then be used by the processor 6 to correct for optical displacement of the image when the user 14 is not located on the optical axis of the mirror assembly 18.

From reading the present disclosure, other variations and modifications will be apparent to persons skilled in the art. Such variations and modifications may involve equivalent and other features which are already known in the design, manufacture and use of mirror assemblies, display devices and component parts thereof and which may be used instead of or in addition to features already described herein.

For example, the glass plate 2 may be substituted by another component provided with a reflective surface that transmits the light 4, including flexible plastic material. The lens 12 may extend over the whole area of the glass plate 2, or its equivalent, instead of being limited to a small portion of this area as shown in FIG. 2.

The mirror assembly may comprise more than one display device. Furthermore, the type of display device is not important. For example, the display device need not comprise a backlit LCD or may comprise one or more light emitting diodes (LEDs) or a cathode ray tube (CRT) instead of an LCD. A display device may include a reflective surface that reflects, rather than emits, light 4 of the second polarisation.

In the above embodiments, the first and second polarisations are linear. However, the first and second polarisations may be elliptical or circular polarisations of opposite "handedness". In this case, the mirror may be a cholesteric mirror. The reflectivity of such a mirror may be tuned by altering the polarisation state of its liquid crystal material, thereby providing an alternative method for a user 14 to adjust the contrast between their reflection 14' and the displayed image 15'. Where elliptical or circular polarisations are used, the lens 12 may be cholesteric lens.

Alternatively, the invention may be implemented using a semi-transparent mirror, which reflects some or all of the light 3 incident at its viewing side and transmits a fraction of the light 4 incident at its non-viewing side, regardless of any polarisation of the light 3, 4. In such an embodiment, the reflective polariser 13 could be omitted.

It is not necessary for the lens 12 to be provided as a separate component of the mirror assembly. For example, the lens could be provided in the form of a layer of refractive material attached to the display device 5, reflective polariser 13, the non-viewing side of the glass plate 2, or equivalent components to these.

The lens 12 may also be provided in an optical system with a variable focal length f. An example of such a variable lens is disclosed in U.S. Pat. No. 6,369,954 B1, in which the focal length f may be adjusted using an electro-wetting arrangement. In this manner, the plane in which a user 14 perceives as the location of the image 15' can be selected by adjusting the focal length f of the variable lens.

Alternatively, a parabolic mirror may be used as a focussing element in place of the lens 12.

Although Claims have been formulated in this Application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. A mirror assembly comprising:
a reflective element having a view side and a non-viewing side, arranged to reflect light incident on the a viewing side and to transmit light (4) incident on a non-viewing side;
a display device located at the non-viewing side of the reflective element (2) for displaying a display image;
a focusing element for focusing the display image onto an image plane that does not coincide with the location of the display device, wherein the mirror assembly further includes,
means for capturing an image of a user located at the viewing side of the reflective element, and
a processor for processing said user image to form the display image by superimposing a silhouette corresponding to the user image onto a second image and removing the data corresponding to the second image in the area coinciding with the silhouette, such that the user sees his or her own reflection in the reflective element superimposed with part of the second image.

2. A mirror assembly according to claim 1, wherein the image plane is located on the viewing side of the reflective element.

3. A mirror assembly according to claim 1, wherein the image plane is located on the non-viewing side of the reflective element.

4. A mirror assembly according to claim 1, wherein the focussing element is a variable focal length lens system.

5. A mirror assembly according to claim 3, wherein the image plane is located behind a second image plane associated with a reflection of the user.

6. A mirror assembly according to claim 5, wherein the display device emits or reflects light of the second polarisation.

7. A mirror assembly according to claim 6, wherein the first and second polarisations are linear and mutually orthogonal.

8. A mirror assembly according to claim 6, wherein the first and second polarisations are opposite circular polarisations.

9. A mirror assembly according to claim 6, wherein the first and second polarisations are opposite elliptical polarizations.

10. A mirror assembly according to claim 6, wherein the reflective element is a cholesteric mirror.

11. A mirror assembly according to claim 1, further comprising an audio output device.

12. A mirror assembly according to claim 1, wherein the focussing element comprises first and second lenses.

13. A mirror assembly (18) according to claim 1, wherein the reflective element reflects light of a first polarisation and transmits light of a second polarisation.

14. A mirror assembly according to claim 13, wherein the processor is configured to:
determine the position of the user, and
modify said display image in accordance with the position of a user in the user image.

15. A mirror assembly according to claim 1, wherein said capturing means comprises one or more cameras.

16. A mirror assembly according to claim 1, further comprising a movement detector.

17. A method of displaying an image in a mirror assembly comprising a reflective element having a viewing side and a non-viewing side, arranged to reflect light incident on the viewing side and to transmit to the viewing side light incident on the non-viewing side, comprising the steps of:
forming a display image comprising a second image,
transmitting said display image to a display device located at the non-viewing side of the reflective element, and
displaying said display image on the display device so that the display image is focused onto an image plane that does not coincide with the location of the display device,
wherein the method further comprises the step of capturing an image of a user located at the viewing side of the element, and in that said forming of a display image includes the steps of:
defining a silhouette image corresponding to the user image, and
superimposing the silhouette image onto the second image and removing the data corresponding to the second image to form the display image, such that the user sees his or her own reflection in the reflective element (2) superimposed with part of the second image.

18. A method according to claim 17, wherein the step of capturing a subject image comprises recording images using more than one camera.

19. A method according to claim 17, further comprising detecting movement of the user.

20. A method according to claim 17, further comprising:
determining the position of the user; and
modifying said display image in accordance with the position of a user in the user image.

21. A method according to claim 17, wherein the image plane is located on the non-viewing side of the reflective element, behind a second image plane associated with a reflection (14') of the user.

22. A method according to claim 17, wherein the step of displaying said display image includes selecting an image plane using a variable focal length lens system.

23. A method according to claim 17, wherein the image is displayed by emitting or reflecting light substantially of a predetermined polarisation.

24. A method according to claim 17, wherein the step of displaying the display image further comprises outputting audio signals associated with the second image.

* * * * *